United States Patent
Price

(10) Patent No.: US 10,349,622 B2
(45) Date of Patent: Jul. 16, 2019

(54) ANIMAL TRANSPORT APPARATUS

(71) Applicant: Timothy B. Price, Denver, CO (US)

(72) Inventor: Timothy B. Price, Denver, CO (US)

( * ) Notice: Subject to any disclaimer, the term of this patent is extended or adjusted under 35 U.S.C. 154(b) by 215 days.

(21) Appl. No.: 15/398,528

(22) Filed: Jan. 4, 2017

(65) Prior Publication Data

US 2017/0188541 A1   Jul. 6, 2017

Related U.S. Application Data

(60) Provisional application No. 62/387,706, filed on Jan. 4, 2016.

(51) Int. Cl.
| | | |
|---|---|---|
| *A61G 7/10* | (2006.01) | |
| *A01K 1/02* | (2006.01) | |
| *A01K 13/00* | (2006.01) | |
| *A45F 3/14* | (2006.01) | |
| *A61G 1/044* | (2006.01) | |

(52) U.S. Cl.
CPC .............. *A01K 1/029* (2013.01); *A01K 13/00* (2013.01); *A45F 3/14* (2013.01); *A45F 2003/142* (2013.01); *A45F 2003/146* (2013.01); *A61G 1/044* (2013.01); *A61G 7/1051* (2013.01)

(58) Field of Classification Search
CPC .......... A61G 1/01; A61G 1/013; A61G 1/044; A61G 7/1023; A61G 1/00; A01K 1/029; A01K 1/0254; A01K 1/0263; A01K 27/002

USPC ........ 119/725, 497; 5/625, 626, 628, 81.1 R, 5/81.1 T
See application file for complete search history.

(56) References Cited

U.S. PATENT DOCUMENTS

| | | | | |
|---|---|---|---|---|
| 163,378 | A * | 5/1875 | Johnson | A01K 1/0613 119/725 |
| 2,489,828 | A * | 11/1949 | Springer | A61G 1/01 5/625 |
| 3,258,788 | A * | 7/1966 | Anciaux | A45F 3/14 182/3 |
| 3,486,671 | A * | 12/1969 | Sanders | A61G 1/04 2/467 |
| 4,723,327 | A * | 2/1988 | Smith | A61G 7/1026 294/140 |
| 4,744,115 | A * | 5/1988 | Marchione | A61G 7/1026 5/81.1 T |
| 4,941,604 | A * | 7/1990 | Nagareda | A47D 13/025 224/160 |
| 4,944,057 | A * | 7/1990 | Shaw | A61G 7/1023 224/159 |
| D362,327 | S * | 9/1995 | Nelson | D34/28 |
| D371,333 | S * | 7/1996 | Fennell | D12/128 |
| 5,720,303 | A * | 2/1998 | Richardson | A61G 1/01 128/870 |

(Continued)

*Primary Examiner* — Yvonne R Abbott-Lewis
(74) *Attorney, Agent, or Firm* — Faegre Baker Daniels LLP

(57) ABSTRACT

Animal transport embodiments are disclosed herein. In an embodiment, an animal transport comprises: a fabric configured to support an animal, the fabric having a first end and a second end, the first end being opposite the second end. The animal transport further comprises a first harness and second harness. The first harness being coupled to the first end of the fabric and comprising straps for securing the first harness to a first user. The second harness being coupled to the second end of the fabric and comprising straps for securing the second harness to a second user.

20 Claims, 3 Drawing Sheets

(56) References Cited

U.S. PATENT DOCUMENTS

| | | | | |
|---|---|---|---|---|
| 6,578,210 B2 * | 6/2003 | Erickson | A61F 5/3792 | 5/83.1 |
| 6,729,511 B2 * | 5/2004 | Dent | A45F 3/14 | 224/157 |
| 6,802,282 B2 * | 10/2004 | Muckleroy | A01K 1/029 | 119/497 |
| 6,845,533 B1 * | 1/2005 | Tulette | A61G 1/042 | 280/47.131 |
| D506,710 S * | 6/2005 | Hurtado | D12/133 | |
| 7,331,493 B2 * | 2/2008 | Dent | A44B 11/08 | 224/157 |
| 7,774,877 B2 * | 8/2010 | Kenalty | A61G 1/01 | 5/494 |
| 7,832,743 B2 * | 11/2010 | Small | A01M 31/006 | 224/921 |
| 8,336,141 B2 * | 12/2012 | Wong | A61G 1/01 | 224/157 |
| 8,474,412 B1 * | 7/2013 | Walden | A01K 1/0263 | 119/725 |
| 8,528,137 B2 * | 9/2013 | Johnson | A61G 1/01 | 5/625 |
| 8,590,077 B2 * | 11/2013 | Saunders | A61G 1/003 | 5/625 |
| 8,615,829 B2 * | 12/2013 | Kenalty | A61G 1/013 | 5/625 |
| 8,640,288 B2 * | 2/2014 | Jensen | A61G 1/01 | 5/625 |
| 8,745,792 B2 * | 6/2014 | McGlynn | A61G 1/00 | 5/625 |
| D767,248 S * | 9/2016 | Rogers | D2/624 | |
| 9,693,919 B2 * | 7/2017 | Berman | A61G 7/1051 | |
| 9,820,905 B2 * | 11/2017 | Bullock | A61G 1/01 | |
| 10,039,680 B2 * | 8/2018 | Galbraith | A61G 7/1055 | |
| 2010/0005593 A1 * | 1/2010 | Bowling | A61G 1/013 | 5/627 |

* cited by examiner

ANIMAL TRANSPORT APPARATUS

CROSS-REFERENCE TO RELATED APPLICATION

This application claims priority to Provisional Application No. 62/387,706, filed Jan. 4, 2016, which is herein incorporated by reference in its entirety.

TECHNICAL FIELD

Embodiments of the present disclosure relate to an animal transport. More specifically, embodiments of the present disclosure relate to an animal transport that is configured to be secured to two people and is configured to carry an animal therein.

BACKGROUND

Occasionally, people engaged in outdoor activities with animals (e.g., a pet) have the misfortune of an animal being unable to complete the remainder of an outing. For example, a dog may twist his/her ankle/paw and, as a result, be unable to continue. When a pet becomes injured and is unable to continue, the pet owner must carry the pet to safety, if he/she is capable of doing so. Picking up and carrying a pet for a sustained period of time is a difficult task and, generally, may only be a realistic solution when the pet is small. Even in these instances, carrying a small pet for a sustained period of time may be unrealistic due to the awkwardness of carrying a pet. In instances where the pet is larger, the pet owner may be unable to pick up and carry the pet for any amount of distance or period of time. If the pet owner is unable to carry the pet, the pet owner may have to leave the pet behind. As such, there is a need for an animal transport that facilitates transporting an animal.

SUMMARY

Embodiments of the disclosure include an animal transport that facilitates transporting a pet by a pet owner.

In an Example, an animal transport comprises: a fabric configured to support an animal, the fabric having a first end and a second end, the first end being opposite the second end; a first harness coupled to the first end of the fabric and comprising straps for securing the first harness to a first user; and a second harness coupled to the second end of the fabric and comprising straps for securing the second harness to a second user.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

Figure 1:
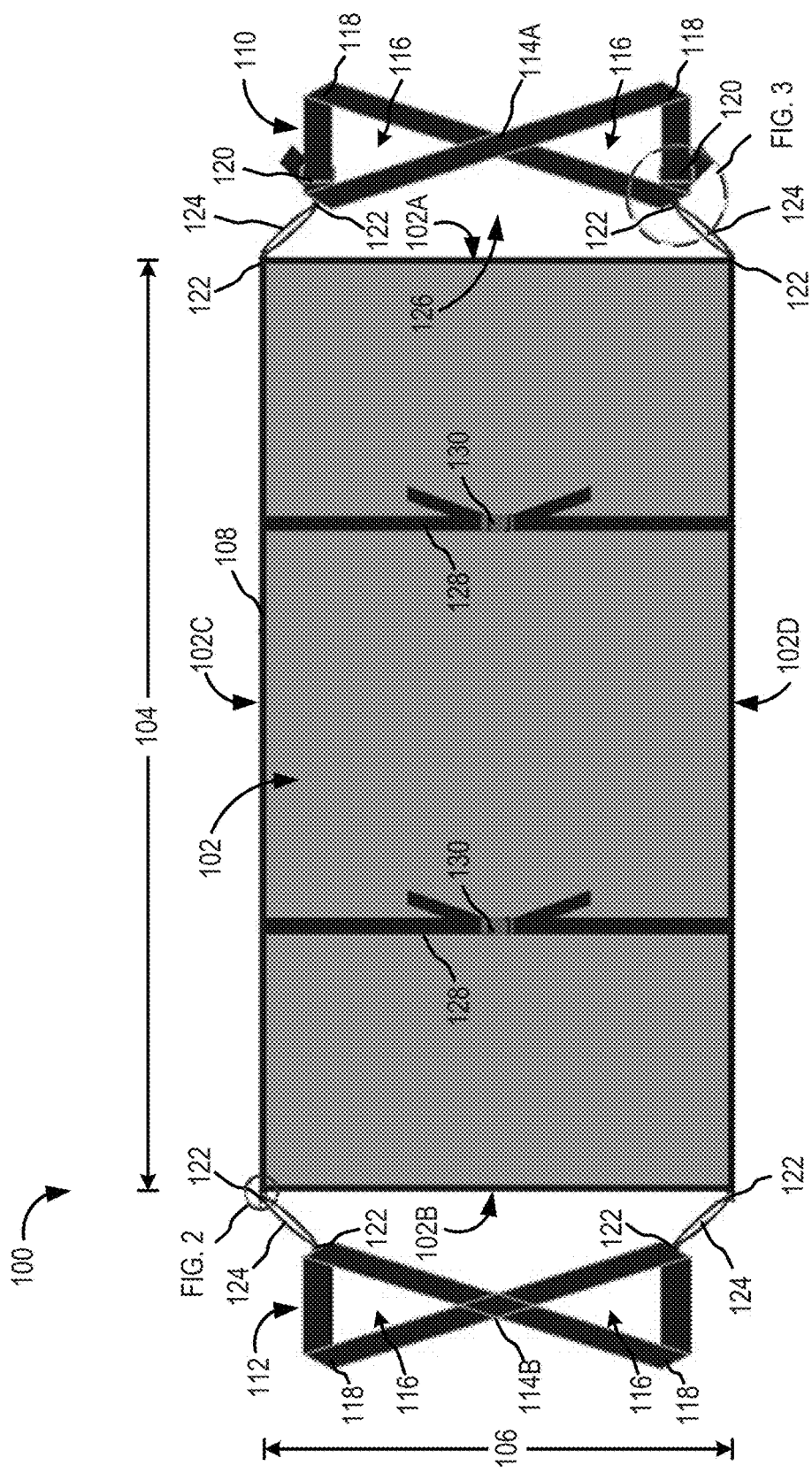
FIG. 1 is a schematic drawing of an illustrative animal transport apparatus, in accordance with embodiments of the disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

Although the term "block" may be used herein to connote different elements illustratively employed, the term should not be interpreted as implying any requirement of, or particular order among or between, various steps disclosed herein unless and except when explicitly referring to the order of individual steps. Additionally, a "set" or "group" of items (e.g., inputs, algorithms, data values, etc.) may include one or more items, and, similarly, a subset or subgroup of items may include one or more items.

DETAILED DESCRIPTION

FIG. 1 is a schematic drawing of an illustrative animal transport 100 apparatus, in accordance with embodiments of the disclosure. In embodiments, the animal transport 100 may be light and capable of being compacted. As such, the animal transport 100 may be put into a container (e.g., a stuff sack) and included in a hiker's pack when the hiker is hiking. For example, the animal transport 100 may be less than or equal to 3 pounds, 2.75 pounds, 2.5 pounds, 2.25 pounds, 2.0 pounds, 1.75 pounds, 1.5 pounds, 1.25 pounds, 1.0 pounds and/or the like. As another example, the animal transport 100 may be capable of compacted and fitting inside a container having a volume of less than or equal to 250 cubic inches (in.), 225 cubic in., 200 cubic in., 175 cubic in., 150 cubic in., 125 cubic in., 100 cubic in. and/or the like.

The animal transport 100 includes fabric 102. The fabric 102 is configured to receive an animal. For example, an animal may be laid lengthwise across the length 104 of the fabric 102. Alternatively, an animal may be laid lengthwise across the width 106 of the animal transport 100. Additionally, the fabric 102 is configured to support an animal. For example, the fabric 102, and the animal transport 100 more generally, may be configured to support up to 100 pounds, 150 pounds, 200 pounds, 250 pounds, 300 pounds, 350 pounds, 400 pounds and/or the like. In embodiments, the fabric 102 may be a generally thin, relatively strong material. For example, the fabric 102 may be comprised of a rip-stop cotton, polyester, polypropylene and/or nylon. However, these are only examples and not meant to be limiting.

In embodiments, the fabric 102 is longer than it is wide. Alternatively, the fabric 102 may be as long as it is wide. Alternatively, the fabric 102 may be wider than it is long. In embodiments, the animal transport may have different sizes to fit different sized pets. For example, the length 104 of the fabric 102 may be about 40 inches (in.), 50 in., 60 in., 70 in., 80 in., 90 in., 100 in., 112 in., 124 in. 130 in., 140 in., 150 in. and/or the like. As another example, the width 106 of the fabric 102 may be about 20 inches (in.), 25 in., 30 in., 35 in., 40 in., 45 in., 50 in., 55 in., 60 in. 65 in., 70 in., 75 in. and/or the like.

In embodiments, the animal transport 100 may include webbing 108 surrounding and coupled to the perimeter of the fabric 102. In embodiments, the webbing 108 may add structure and durability to the fabric 102 and/or may increase the weight bearing capability of the fabric 102. Additionally or alternatively, the webbing 108 may reduce the likelihood that the fabric 102 is torn and/or ripped. In embodiments, the webbing 108 may be comprised of polyester, polypropylene, nylon and/or other suitable materials. Additionally or alternatively, the webbing 108 may be about ¼ in., ½ in., ¾ in., 1 in., 1¼ in., 1½ in., 1¾ in., 1¾ in., 2 in. and/or the like.

The animal transport 100 includes a first harness 110 coupled to a first end 102A of the fabric 102 and/or the webbing 108 and a second harness 112 coupled to a second end 102B of the fabric 102 and/or a the webbing 108, wherein the first end 102A is opposite the second end 102B. In embodiments, the first harness 110 is configured to be secured to a first user and the second harness 112 is configured to be secured to a second user. In embodiments, the first harness 110 is secured to the front of the first user and the second harness 112 is secured to the back of the second user. After the animal is placed on the fabric 102 and the first and second harness are secured to first and second users, respectively, the first and second users pick up the animal transport 100, which has the animal disposed therein, and walk with the animal extended between the first and second users. Since the first harness 110 is secured to the front of the first user and the second harness 100 is secured to the back of the second user, the first and second users are both capable of walking forward in the same direction.

To be configured to be secured to first and second users the first and second harnesses 110, 112 are made of straps. In embodiments, the straps of the first and/or second harnesses 110, 112 may be comprised of polyester, polypropylene, nylon and/or other suitable materials. Additionally or alternatively, the width of the straps of the first and/or second harnesses 110, 112 may be about ¼ in., ½ in., ¾ in., 1 in., 1¼ in., 1½ in., 1¾ in., 2 in. and/or the like.

In embodiments, the first and/or second harnesses 110, 112 may be made of a single strap and/or stitched together at respective sections 114A, 114B of the straps to form a figure eight. When the first and/or second harnesses 110, 112 are stitched together to form a figure eight, the first and/or second harnesses 110, 112 each include two openings 116. In other embodiments where the first and/or second harnesses 110, 112 are not stitched together to form a figure eight, the first and/or second harnesses 110, 112 may still include two openings 116. Each of the two openings 116 included in each of the first and second harnesses 110, 112 are configured to receive the respective arms of the first and second users.

The straps include portions 118 which rest on the shoulders of the first and second users after the first and second users put their arms through the openings 116. Since, however, the first harness 110 is configured to be secured to the front of a first user and the second harness 112 is configured to be secured to the back of a second user, the section 114A of the first harness 110 may proximal to the chest of the first user and the section 114B of the second harness 112 may be proximal to the back of the second user.

In embodiments, the first and/or second harnesses 110, 112 may include buckles 120 for adjusting the size of each of the two openings 116. The buckles 120 may be adjusted to fit different size users. In embodiments, the buckles 120 may be made of metal, plastic and/or any other suitable material.

Figure 2:
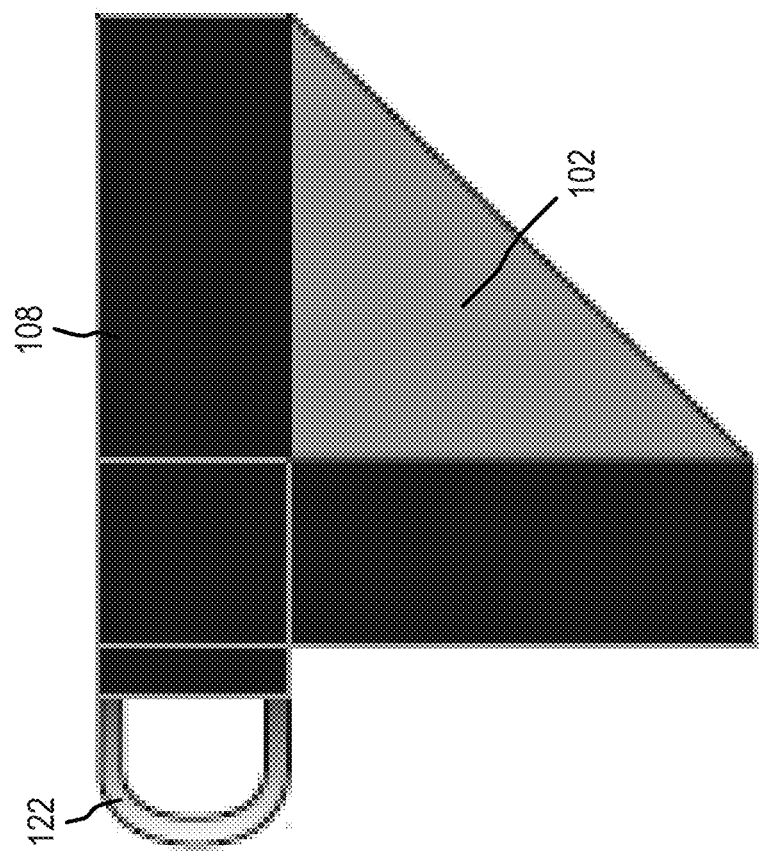
FIG. 2 is a schematic drawing of a portion of the illustrative animal transport apparatus depicted in FIG. 1, in accordance with embodiments of the disclosure.

In embodiments, the first harness 110 and/or the second harness 112 may be directly coupled to the fabric 102 and/or the webbing 108. For example, the first and/or second harnesses 110, 112 may be directly coupled to the fabric 102 and/or the webbing 108 via couplers 122 (e.g., metal d-rings). A close-up view of a coupler 122 (depicted as a metal d-ring) attached to a portion of the fabric 102 and/or the webbing 108 is depicted in FIG. 2. Alternatively, as another example, the first and/or second harnesses 110, 112 may be directly coupled to the fabric 102 and/or the webbing 108 by being stitched directly to the fabric 102 and/or webbing 108.

In some embodiments, however, the first harness 110 and/or the second harness 112 may be indirectly coupled to the fabric 102 and/or the webbing 108. For example, the first and/or second harnesses 110, 112 may be coupled to extension straps 124, which are then coupled to the fabric 102 and/or webbing 108. Alternatively, as another example, the first harness 110 may be indirectly coupled to the fabric 102 and/or webbing 108 via extension straps 124 while the second harness 112 is directly coupled to the fabric 102 and/or webbing 108. Alternatively, as even another example, the second harness 112 may be indirectly coupled to the fabric 102 and/or webbing 108 via extension straps 124 while the first harness 110 is directly coupled to the fabric 102 and/or webbing 108. The extension strap 124 may function to space apart the first and/or second harnesses 110, 112 from the fabric 102 and/or the webbing 108. The benefit of including an extension strap 124 that spaces apart the first harness 110 from the fabric 102 and/or webbing 108 is so that when the first user is walking with the animal transport 100 and facing towards the animal transport 100, the first user can see where he/she is stepping via the gap 126 created between the first user and the fabric 102 and/or webbing 108 by the extension straps 124. This may be especially advantageous if the first user is hiking in uneven (e.g., rocky) terrain.

Figure 3:
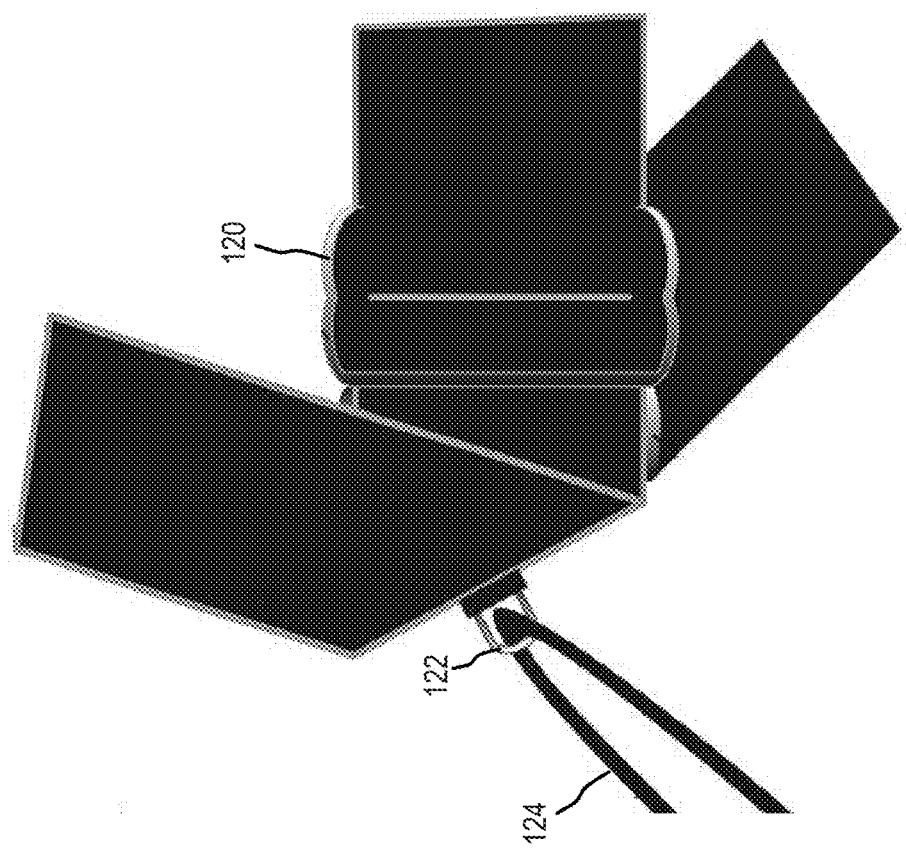
FIG. 3 is a schematic drawing of another portion of the illustrative animal transport apparatus depicted in FIG. 1, in accordance with embodiments of the disclosure.

In some embodiments, the first and/or second harnesses 110, 112 may be coupled to extension straps 124 via couplers 122 (e.g., metal d-rings). A close-up view of an extension strap 124 attached to a coupler 122 (depicted as a metal d-ring), which is attached to the first harness 110 is depicted in FIG. 3. Alternatively, in embodiments, the first and/or second harnesses 110, 112 may be coupled to extension straps 124 by being stitched to the extension straps 124. In embodiments, the extension straps 124 may be coupled to the fabric 102 and/or webbing 108 via couplers 122 (e.g., metal d-rings). Alternatively, in embodiments, the extension straps 124 may be coupled to the fabric 102 and/or webbing 108 by being stitched to the fabric 102 and/or webbing 108.

In embodiments, the animal transport 100 may include one or more straps 128 for securing an animal to the fabric 102. While two straps 128 are shown, more or fewer straps 128 may be included in the animal transport 100. In embodiments, the straps 128 may be configured to extend across the fabric and be secured to opposite sides of the fabric 102. For example, the straps 128 may extend from a first side 102C of the fabric 102 to a second side 102D of the fabric 102, wherein the first side 102C is opposite the second side 102D. In embodiments, the straps 128 may be spaced along the length 104 of the fabric 102. For example, a first strap 128 may be located about ⅕ the length 104, ¼ the length 104, ⅓ the length 104, ⅖ the length 104 and/or the like from the first end of the fabric 102 and/or a second strap 128 may be located ⅕ the length 104, ¼ the length 104, ⅓ the length 104, ⅖ the length 104 from the second end of the fabric 102.

In embodiments, the straps 128 may be comprised of polyester, polypropylene, nylon and/or other suitable materials. Additionally or alternatively, the width of the straps 128 may be ¼ in., ½ in., ¾ in., 1 in., 1¼ in., 1½ in., 1¾ in., 2 in. and/or the like.

In embodiments, the straps 128 may be comprised of two sections that are connected via one or more buckles 130. In embodiments, the buckles 130 may connect the two sections of the straps 128 by clicking together. Alternatively, the buckles 130 may connect the two sections of the straps 128 by being connected to one section of a strap 128 and interweaving another section of the strap 128 with the buckle 130.

Due to the embodiments described above, a pet owner may be able to carry a pet that has been injured and/or is otherwise unable to continue an outing. As such, the pet owner may be less likely to have to leave the pet behind if a pet does become injured and/or is otherwise unable to continue an outing.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. An animal transport comprising:
   a fabric configured to support an animal, the fabric having a first end and a second end the first end being opposite the second end;
   a first harness coupled to the first end of the fabric and comprising straps for securing the first harness to a first user;
   a second harness coupled to the second end of the fabric and comprising straps for securing the second harness to a second user;
   at least one strap configured to secure the animal to the fabric; and
   wherein the first harness and the second harness each comprise two openings that are configured to receive the respective arms of the first and second users, wherein the two openings comprise at least one buckle to adjust the respective sizes of the two openings.

2. The animal transport of claim 1, wherein the first and second harnesses are coupled to the fabric using d-rings.

3. The animal transport of claim 1, wherein the straps of the first harness are configured to be secured to the front of the first user and the straps of the second harness are configured to be secured to the back of the second user.

4. The animal transport of claim 3, further comprising extension straps coupling the first harness to the first end of the fabric, the extension straps being configured to space apart the first harness from the first end of the fabric.

5. The animal transport of claim 4, wherein the extension straps are coupled to the first harness and the first end of the fabric using d-rings.

6. The animal transport of claim 1, wherein the first and second harnesses are each comprised of a single piece of webbing.

7. The animal transport of claim 6, wherein each of the single pieces of webbing are stitched together to form a figure eight and wherein the stitching separates the respective two openings of the first and second harnesses.

8. The animal transport of claim 1, wherein the first and second harnesses comprise respective buckles for adjusting the sizes of the two openings.

9. The animal transport of claim 1, wherein the at least one strap comprises two portions and a buckle that couples the two portions together.

10. The animal transport of claim 1, wherein the at least one strap comprises buckles for adjusted the length of the at least one strap.

11. The animal transport of claim 1, wherein the fabric is comprised of a rip-stop material that weighs less than 1 pound and is configured to support up to 300 pounds.

12. The animal transport of claim 1, wherein the animal transport is configured to fit inside a container having a volume of 150 cubic inches.

13. The animal transport of claim 1, further comprising webbing surrounding and coupled to the perimeter of the fabric.

14. The animal transport of claim 13, wherein the webbing is between about ½ inch and 1 inch wide.

15. The animal transport of claim 1, wherein the fabric is longer than it is wide.

16. The animal transport of claim 15, wherein the length of the fabric is between about 40 inches to about 150 inches and the wide of the fabric is between about 20 inches to about 75 inches.

17. The animal transport of claim 1, wherein the fabric is rectangular.

18. The animal transport of claim 1, the fabric having a first side and a second side, the first side being opposite the second side, wherein the at least one strap has a first end coupled to the first side and a second end coupled to the second side.

19. The animal transport of claim 18, wherein the at least one strap comprises more than one strap.

20. The animal transport of claim 1, wherein the at least one strap comprises two sections connected by a buckle.

* * * * *